(12) United States Patent
Beysel

(10) Patent No.: US 11,370,297 B2
(45) Date of Patent: Jun. 28, 2022

(54) ONE-PIECE COMBINED PLASTIC UREA AND FUEL TANK WITH BAFFLES, ROTOMOULDED WITH A SPECIAL MOLD HEATING SYSTEM

(71) Applicant: FLOTEKS PLASTIK SANAYI VE TICARET ANONIM SIRKETI, Osmangazi/Bursa (TR)

(72) Inventor: Veysel Celal Beysel, Osmangazi/Bursa (TR)

(73) Assignee: FLOTEKS PLASTIK SANAYI VE TICARET ANONIM SIRKETI, Bursa (TR)

( * ) Notice: Subject to any disclaimer, the term of this patent is extended or adjusted under 35 U.S.C. 154(b) by 114 days.

(21) Appl. No.: 16/498,913

(22) PCT Filed: Oct. 8, 2018

(86) PCT No.: PCT/TR2018/050565
§ 371 (c)(1),
(2) Date: Sep. 27, 2019

(87) PCT Pub. No.: WO2019/103714
PCT Pub. Date: May 31, 2019

(65) Prior Publication Data
US 2020/0114754 A1 Apr. 16, 2020

(30) Foreign Application Priority Data
Nov. 27, 2017 (TR) .............................. TR2017/18907

(51) Int. Cl.
B60K 15/077 (2006.01)
B60K 15/03 (2006.01)
B29L 31/00 (2006.01)

(52) U.S. Cl.
CPC ...... *B60K 15/03177* (2013.01); *B60K 15/077* (2013.01); *B29L 2031/7172* (2013.01);
(Continued)

(58) Field of Classification Search
CPC .......... B60K 15/077; B60K 2015/0777; B60K 15/03177; B60K 2015/0344;
(Continued)

(56) References Cited

U.S. PATENT DOCUMENTS 3,912,107 A * 10/1975 Baumann ............... B65D 90/44
220/563
4,511,105 A * 4/1985 Morrisey ............... B29C 53/602
220/564
(Continued)

FOREIGN PATENT DOCUMENTS

WO 201002367 A1 1/2010

OTHER PUBLICATIONS

International Search Report and Written Opinion issued in PCT/TR2018/050565, dated Apr. 19, 2019; ISA/TR.

*Primary Examiner* — Stephen J Castellano
(74) *Attorney, Agent, or Firm* — Bayramoglu Law Offices LLC

(57) ABSTRACT

The present invention relates to a plastic tank which provides storing of gasoline and urea liquid called adblue, used in automotive industry, particularly in vehicles which operate with gasoline and which reduces the damage of vehicles, which operate with gasoline, to the environment, in a single tank with two chambers, and relates to a special core heating system designed for production of this tank by using rotation technology.

11 Claims, 2 Drawing Sheets

(52) U.S. Cl.
CPC ............... *B60K 2015/0344* (2013.01); *B60K 2015/03453* (2013.01); *B60K 2015/0775* (2013.01); *B60K 2015/0777* (2013.01)

(58) Field of Classification Search
CPC .. B60K 2015/03453; B60K 2015/0775; B60K 15/03; B29L 2031/7172
USPC ...................................... 220/563, 564, 4.14
See application file for complete search history.

(56) References Cited

U.S. PATENT DOCUMENTS

| | | |
|---|---|---|
| 4,517,231 A | 5/1985 | May et al. |
| 5,850,933 A * | 12/1998 | Pazik .................. B60K 15/077 220/563 |
| 6,138,859 A | 10/2000 | Aulph et al. |
| 2013/0213973 A1 | 8/2013 | Esser |
| 2019/0152646 A1 * | 5/2019 | Allan .................... B60K 11/02 |

* cited by examiner

ONE-PIECE COMBINED PLASTIC UREA AND FUEL TANK WITH BAFFLES, ROTOMOULDED WITH A SPECIAL MOLD HEATING SYSTEM

CROSS REFERENCE TO RELATED APPLICATIONS

This application is a U.S. National Phase Application under 35 U.S.C. 371 of International Application No. PCT/TR2018/050565, filed on Oct. 8, 2018, which claims the benefit of priority from Turkish Patent Application No. TR 2017/18907, filed Nov. 27, 2017. The entire disclosures of the above applications are incorporated by reference herein.

TECHNICAL FIELD

The present invention relates to a plastic tank which provides storing of fuel and urea liquid called Adblue®, used in automotive industry, particularly in vehicles which operate with fuel and which reduces the damage of vehicles, which operate with fuel, to the environment, in a single tank with two chambers, and relates to a special core heating system designed for production of this tank by using rotation technology.

PRIOR ART

Water tanks, fuel tanks, plastic canoes, traffic pins and similar plastic products are produced by means of rotational molding. Rotational molding is a method where the powder material placed into a mold is molten and dispersed on the mold inner surface by means of applying heat to the mold from outside and by means of rotating the mold in the horizontal and orthogonal axis and where said material is hardened and takes the shape of the mold. In this method, hollow and single sectional products can be easily produced.

In the related art, production of two section products where there is no passage in between is difficult. Because:
  a) For such productions, the powder raw material put into the mold shall circulate in both sections; in other words, closure of the section between the sections prior to molding will lead to a problem.
  b) Wrapping raw material around the cores which are required for the two section products is possible by means of heating the cores at the mold outer wall level and homogeneously. This is not possible as long as special precautions are not taken.

Another problem is the strong vibrations and inertia powers which occur in case of road conditions, road bends, braking actions and acceleration actions in case such sectional products are used in vehicles as fuel tank. Various conventional plastic tanks cannot endure such conditions. Placement of baffles into the plastic tank in order to increase this resistance is problematic because of the difficulties in heating the cores which are required to be placed for the formation of baffle.

In addition to these, in order to prevent the damage given to the environment particularly in diesel and gasoline vehicles, urea-additive solution, sprayed into the exhaust gas and whose commercial name is Adblue®, is used together with the fuel. This chemical substance is kept in a separate tank and so as not to mix into the fuel. For the assembly thereof onto the vehicle, two separate tanks, two separate transportation systems and transportation belts are needed. Two separate tanks and their separate transportation systems lead to cost and weight problems in practice. The increase in the weight of the vehicles leads to increase in fuel consumption, cost, environmental pollution and carbon emission.

As a result, because of all of the abovementioned problems, an improvement is required in the related technical field.

BRIEF DESCRIPTION OF THE INVENTION

The present invention has been developed for producing vehicle tank having two chambers in rotation technology and which does not permit liquid passage in between and which are adhered to each other and having sufficient rigidity to be able to pass regulation tests applied in automotive, for eliminating the above mentioned disadvantages and for bringing new advantages to the related technical field.

The main object of the present invention is to produce a one-piece plastic tank with rotation technology and in a single production step with at least two chambers such that there is no liquid passage in between.

Another object of the present invention is to bring the heat of the cores, placed to the mold for forming baffles and the wall which separates two separate walls, to the same level as the other walls of the mold in a rapid and homogeneous manner.

Another object of the present invention is to provide a mold core heating system which increases energy saving in shaping the materials in rotational molding and which reduces carbon footprint.

Another object of the present invention is to realize core heating by means of various methods applied currently in rotation technology.

Another object of the present invention is to accelerate the core heating by means of heat pipes through one end thereof and thus to increase the efficiency.

Another object of the present invention is to accelerate the core heating by means of heat pipes system heated by air heated with electricity or gas inside the furnace from one end and thus to increase the efficiency.

Another object of the present invention is to bring the heat in the core regions to equivalent level with the mold and to bring the product wall thickness in the core regions to the wall thicknesses in the other regions of the mold.

Another object of the present invention is to provide a product which is resistant to vibration and which has two walls thanks to the special design of the wall between two chambers, where liquid passage in between is prevented, and where the two walls are contacted each other at specific intervals thanks to a special design.

In order to realize all of the abovementioned objects and the objects which are to be deducted from the detailed description below, the present invention is a mold system used for shaping polymer-based materials by means of heat and where specially designed cores, formed only by heat pipes, are used when required.

In another preferred embodiment of the present invention, the separator wall, formed thanks to the core and which separates two chambers, has two walls.

In another preferred embodiment of the present invention, in order to form the wall between the two chambers of the mold, the heat pipes which extend from one face of the mold to the other face of the mold are sufficient in number in order to separate the two chambers. Thus, since there are pluralities of heat pipes, every heat pipe provides complete separation of the two chambers of the one-piece tank in a manner not permitting liquid passage and moreover, provides contacting of the two walls formed between the two chambers.

In another preferred embodiment of the present invention, one end or two ends of the heat pipes, placed side by side in multiple manner when required and forming the intermediate wall, extend(s) outwardly from the mold. Thus:
A) The heat pipe will rapidly provide the energy, to be received from the hot air circulation, to the inside of the heat pipe and/or of the core which supports production of the separation wall.
B) And/or each heat pipe will be heated by means of electrical heaters provided at the outer ends of the heat pipes and which will be designed as the component part thereof, and each heat pipe will rapidly provide the energy to the inside of the heat pipe and/or of cores which support production of the separation wall.

In another preferred embodiment of the present invention, the cross section of the heat pipes is circular, elliptical or other geometry as required.

In order to realize all of the abovementioned objects and the objects which are to be deducted from the detailed description below, the present invention is a combined tank with two chambers produced with a single process where polymer-based materials are heated by means of free heat pipes or heat pipes, positioned in the core, by using rotation technology, and a mold method used for this purpose.

Accordingly, said invention comprises the steps of:
a) Contacting the heat pipe with electrical heaters from one end thereof and thus, providing the heat to the deep parts of the mold with the help of the cores used or only by means of the combined usage of the heat pipes
b) In cases where electrical heater is not preferred, heating the heat pipe only by means of the hot air circulating in the rotation furnace or by means of radiation and providing the heat to the deep parts of the mold with the help of the cores used or only by means of the combined usage of the heat pipes
c) Realizing the heating process in the cores, forming the double wall, and in the cores of double wall baffles and in the mold wall at the same level thanks to the heat pipes.

In another preferred embodiment of the present invention, the used heat pipes can provide the required heat from the electrical heaters which are the component part of the heat pipes.

In another preferred embodiment of the present invention, the used heat pipes can provide the required heat from the temperature of air, which circulates in the furnace, when desired.

In another preferred embodiment of the present invention, the furnace temperature can be provided through any electrical or gas energy supplies.

In order to realize all of the abovementioned objects and the objects which are to be deducted from the detailed description below, the present invention is a combined fuel tank with double chambers and having double-wall baffles, which prevent acceleration powers, and having a sealed double wall in between and used particularly in motorized vehicles and made of polymer-based material by means of rotational molding method.

In another preferred embodiment of the present invention, the double-wall sealed intermediate wall, which separates the two chambers, can be formed with the help of multiple heat pipes placed to the mold in a manner forming joining points described as "kiss off" in order to increase resistance against vibration when required.

In another preferred embodiment of the present invention, if required because of the dimension of the combined tank where a double wall is formed which prevents sealing as mentioned above, required number of baffles are placed to the required locations which reduce agitation, and thus which reduce the unfavorable effect of noise and acceleration forces.

In order to realize all of the abovementioned objects and the objects which are to be deducted from the detailed description below, the present invention is a combined multi-chambered fuel tank produced by means of the abovementioned system.

In another preferred embodiment of the present invention, the heat of the medium is carried to the deep parts of the wall and baffle cores by means of usage of heat pipes, and the wall thickness of all surfaces of the fuel tank obtained is equalized within the given tolerances.

In order to realize all of the abovementioned objects and the objects which are to be deducted from the detailed description below, the present invention is a combined Adblue® and fuel tank produced with rotation technology from plastic material by means of the abovementioned method.

REFERENCE NUMBERS

Figure 1:
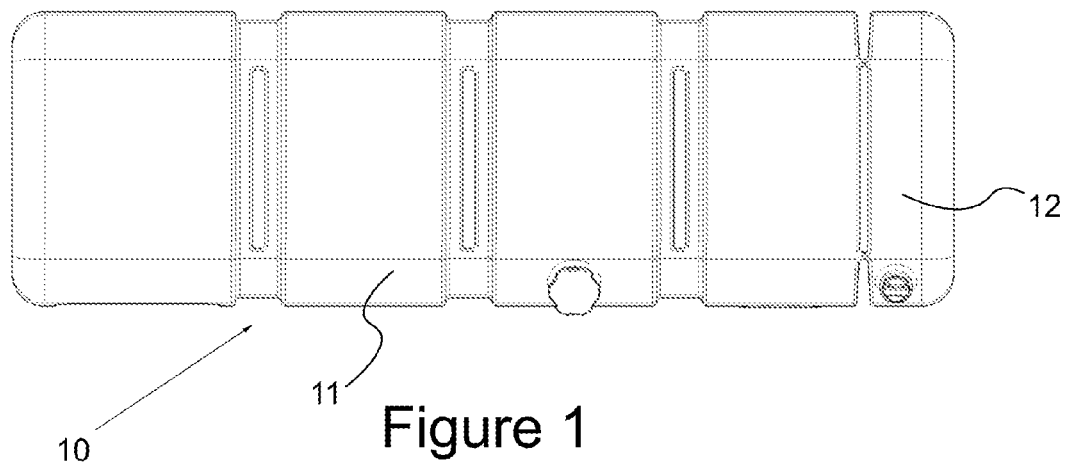
FIG. 1 is a representative view of the fuel tank.
Figure 2:
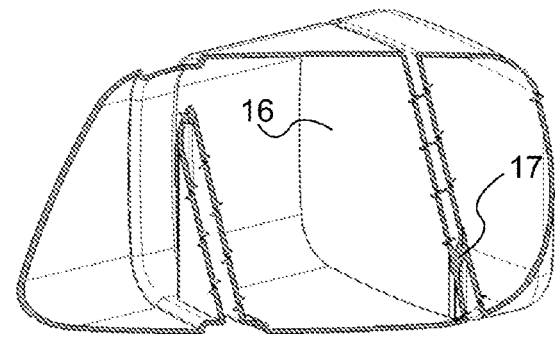
FIG. 2 is the cross sectional view of the fuel tank.
Figure 3:
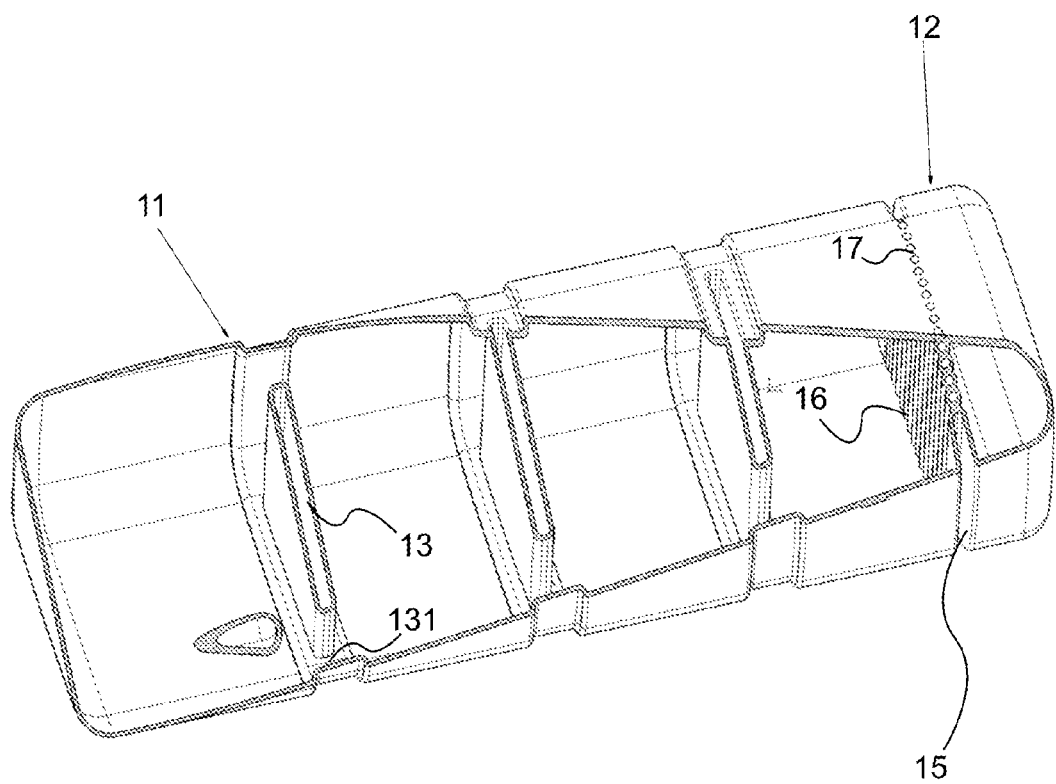
FIG. 3 is another cross sectional view of the fuel tank.

10 Fuel tank
11 First chamber
12 Second chamber
13 Baffle
  131 Passage gap
15 Compartment recess
16 Wall
17 Joining point
X: intermediate distance

DETAILED DESCRIPTION OF THE INVENTION

In this detailed description, the subject matter rotomoulded fuel tank (10) is explained with references to examples without forming any restrictive effect only in order to make the subject more understandable.

With reference to FIG. 1, the fuel tank (10) having pluralities of compartments comprises a first chamber (11) and a second chamber (12). Said first chamber (11) and said second chamber (12) have a hollow rectangular prism-like form. A double wall (16), which provides sealing, is embodied between said first chamber (11) and said second chamber (12). Between the first chamber (11) and the second chamber (12), there is a compartment recess (15) embodied in recess form from outside at least along the two mutual surfaces and where said wall (16) extends between these two mutual recesses.

The baffle (13) and the wall (16) embodied on the fuel tank (10) are provided by means of cores which are compliant with the rotation technology and which are used in the art. By means of at least one heat pipe placed in a snap-fit manner onto the cores, the baffle (13) and the wall (16) can be obtained which remain at the inner sections of the fuel tank (10). The heat pipes can receive heat by means of convection formed in the inner ambiance of the furnace or by means of radiation received from the heat supply and moreover, the heat pipes can receive heat by means of electrical heaters placed as the component part thereof.

In an embodiment of the invention, in order to reduce the harmful effect of vibrations, at least one joining point (17) is defined at the contact points, also named as kiss off in rotation technology, between the double wall (16) and the baffles (13). In the preferred application, there are pluralities of said joining points (17). The wall (16) compartment recesses (15) are connected through the joining points (17) and thus, they function as a one-piece sealed barrier between the first chamber (11) and the second chamber (12).

In order to dampen acceleration and noise problems, the double-wall baffles (13), placed to the required locations of the one-piece combined plastic fuel tank (10), are connected to at least one surface of the first chamber (11) and the second chamber (12), and said double-wall baffles (13) comprise gaps in a manner defining a liquid passage gap (131) between at least one surface of the first chamber (11) and the second chamber (12).

Preferably, the baffles (13) are connected to at least two each mutual surfaces of the first chamber (11) and the second chamber (12), wherein the baffles (13) are provided, in order to increase resistance against vibration. By means of said passage gap (131), the movement and the dispersion of the liquid between baffles (13) are provided and thus, fuel suctioning by the suctioning pump of the tank is always provided.

The determination of whether which baffle (13) and/or which intermediate wall (16) will comprise joining point (17) is realized according to the result of the static and dynamic analysis which will be realized according to vibration reducing, noise dampening and storage volume geometry.

When the joining points (17) are examined from outside after shaping, it is observed that they are in the form of pluralities of grooves embodied at predetermined intermediate distances (x) between each other. Between the grooves, polymer material is filled.

At the same time, this embodiment, which provides sealing between the first chamber (11) and the second chamber (12), provides dampening of the vibration, tension and noise formed in the first chamber (11), in the second chamber (12) and in the baffles (13).

Thanks to the invention whose detailed description is given above, particularly the need for usage of two separate tanks for the fuel tank (10) and for the Adblue (R) tank particularly in motorized vehicles, which operate with diesel, can be prevented. Thus, there will be no need to use separate chassis connection and belt system for the first chamber (11) and for the second chamber (12). Besides, space saving and weight saving can also be provided in vehicles. These savings reduce carbon footprint, reduce environmental pollution, moreover they provide fuel saving.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A combined fuel tank used in vehicles with diesel motor using a urea-based chemical substance and made of polymer-based material by using rotation technology, said fuel tank enclosing an interior and being a one-piece body comprising
   a first chamber;
   a second chamber positioned in the vicinity of said first chamber;
   a sealed double-wall between the first chamber and the second chamber;
   compartment recesses between the first and second chambers and the double-wall extends between two compartment recesses; and
   a baffle positioned in at least one of the first chamber and the second chamber and which provides dampening of noise and vibration.

2. The combined fuel tank according to claim 1, wherein joining points are provided in the double-wall which are obtained by means of the kiss off method.

3. The combined fuel tank according to claim 2, wherein pluralities of joining points are provided.

4. The combined fuel tank according to claim 1, wherein said double wall comprises at least one joining points obtained by the kiss off method.

5. The combined fuel tank according to claim 1, wherein said double-wall comprises a plurality of joining points.

6. The combined fuel tank according to claim 1, comprising a plurality of baffles, wherein each of the plurality of baffles is positioned in at least one of the first chamber and the second chamber.

7. The combined fuel tank according to claim 1, wherein at least one passage gap is provided which is defined between at least one side surface of the fuel tank and the baffle.

8. The combined fuel tank according to claim 1, wherein the baffle has two walls and a form which combines at least two surfaces of the fuel tank.

9. The combined fuel tank according to claim 1, wherein heat is carried by means of usage of heat pipes, and the wall thickness of all surfaces of the fuel tank obtained is equalized.

10. The combined fuel tank according to claim 1, wherein the double wall and the compartment recesses are connected through the joining points forming a one-piece sealed barrier.

11. A combined fuel tank used in vehicles with diesel motor using a urea-based chemical substance and made of polymer-based material by using rotation technology, said fuel tank enclosing an interior and being a one-piece body comprising
   a first chamber;
   a second chamber positioned in the vicinity of said first chamber;
   a sealed double-wall between the first chamber and the second chamber;
   compartment recesses between the first and second chambers and the double-wall extends between two compartment recesses;
   a plurality of joining points, the double-wall and the compartment recesses are connected through the joining points forming a one-piece sealed barrier; and
   a baffle positioned in at least one of the first chamber and the second chamber and which provides dampening of noise and vibration;
   wherein at least one passage gap is provided which is defined between at least one side surface of the fuel tank and the baffle.

* * * * *